(12) United States Patent
Sladen et al.

(10) Patent No.: US 11,125,274 B1
(45) Date of Patent: Sep. 21, 2021

(54) CENTRALIZED OIL DISTRIBUTION SYSTEM

(71) Applicant: Zulu Pods, Inc., Miami, FL (US)

(72) Inventors: Daniella Sladen, North Lauderdale, FL (US); Troy P. Cunningham, Miami, FL (US)

( * ) Notice: Subject to any disclaimer, the term of this patent is extended or adjusted under 35 U.S.C. 154(b) by 0 days.

(21) Appl. No.: 17/116,872

(22) Filed: Dec. 9, 2020

(51) Int. Cl.
| | |
|---|---|
| F16C 33/66 | (2006.01) |
| F16N 9/02 | (2006.01) |
| F16C 3/02 | (2006.01) |
| F16N 7/02 | (2006.01) |
| B64D 27/10 | (2006.01) |

(52) U.S. Cl.
CPC ............ F16C 33/6681 (2013.01); F16C 3/02 (2013.01); F16N 7/02 (2013.01); F16N 9/02 (2013.01); *B64D 27/10* (2013.01); *F16C 2300/02* (2013.01); *F16C 2326/43* (2013.01); *F16N 2210/08* (2013.01); *F16N 2210/14* (2013.01)

(58) Field of Classification Search
CPC .......... F16N 2210/14; F16N 7/02; F16N 9/02; F16C 33/6681; F16C 33/00; F16C 33/66
See application file for complete search history.

(56) References Cited

U.S. PATENT DOCUMENTS

| | | | | |
|---|---|---|---|---|
| 2,212,218 | A * | 8/1940 | Whiteley | F16N 7/02 184/65 |
| 2,742,332 | A * | 4/1956 | Cobb | F16C 33/667 384/462 |
| 3,425,759 | A * | 2/1969 | Schwarzschild | F16C 33/66 384/491 |
| 5,320,433 | A * | 6/1994 | Kimata | F16C 19/163 384/473 |
| 5,725,617 | A * | 3/1998 | Hagiwara | B24D 3/34 51/295 |
| 8,672,555 | B2 * | 3/2014 | Gardelle | F16C 33/6648 384/475 |
| 9,371,498 | B2 * | 6/2016 | Bongaerts | F16C 33/6655 |
| 2015/0159112 | A1 * | 6/2015 | Strandell | F16N 9/00 508/110 |

\* cited by examiner

*Primary Examiner* — Michael R Mansen
*Assistant Examiner* — Mark K Buse
(74) *Attorney, Agent, or Firm* — Sanchelima & Associates PA; Christian Sanchelima; Jesus Sanchelima

(57) ABSTRACT

An oil distribution system including a shaft assembly, bearing assembly and mounting assembly is disclosed. The shaft assembly includes a shaft with an inner shaft. A pocket is defined between the shaft and the inner shaft. A ringed lattice containing oil is secured within the pocket, melting of the ringed lattice releases the oil. The shaft includes shaft slots to usher oil from the pocket towards the bearing assembly. The bearing assembly includes an inner and outer race. The inner and outer race each include axial slots and radial slots. The axial slots of the inner race align with the shaft slots to allow oil to flood the inner race. The mounting assembly includes a bearing support having bearing support slots to receive a stringed lattice. Oil from the bearing support flows into the outer race when the axial slots of the outer race align with the bearing support slots.

20 Claims, 9 Drawing Sheets

CENTRALIZED OIL DISTRIBUTION SYSTEM

BACKGROUND OF THE INVENTION

1. Field of the Invention

The present invention relates to a centralized oil distribution system, more particularly, to an oil distribution system that selectively delivers and disperses oil to the engine of vehicles, such as aircrafts, for proper function of the engine, eliminating the need to maintain oil circulating through the engine.

2. Description of the Related Art

Several designs for oil distribution systems have been designed in the past. None of them, however, include a shaft and a bearing support which receives a lattice within. The lattice includes pods containing oil to be delivered to the engine of machinery or vehicles. The lattice and each individual pod disintegrate or burst at a predetermined temperature to selectively deliver and disperse oil within the engine for proper function thereof. Supported between the shaft and the bearing support is a bearing with bearing races. The shaft, bearing races and the bearing support include slots that allow for the oil to maneuver through the engine for lubrication of the necessary components within. Thereby resulting in reduced engine costs, weight and complexity as there are less components necessary to deliver oil to the engine as the need for oil to be constantly circulating through the engine is eliminated.

Applicant believes that a related reference corresponds to U.S. Pat. No. 2,742,332 for bearings and lubrication therefor. Applicant believes that another related reference refers to U.S. Pat. No. 9,371,498 for a lubricant system and method of forming the same. None of these references, however, teach of a lattice secured within an engine, more particularly at a shaft and bearing support of the engine, which disintegrates at a predetermined temperature to deliver oil to the engine for lubrication to permit proper functioning thereof. The oil is distributed through the shaft, bearing races and bearing support of the engine through slots that allow the oil to flow freely through the shaft, bearing races and bearing support for lubrication.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide an oil distribution system that selectively delivers and distributes oil within an engine of a machinery or vehicle, when a predetermined temperature is achieved within the engine for proper function thereof.

It is another object of this invention to provide an oil distribution system that eliminates the need to have constant flowing oil through an engine of a vehicle or machinery.

It is still another object of the present invention to provide an oil distribution system that reduces the weight, complexity and cost of an engine for a vehicle or machinery.

It is also another object of the present invention to provide an oil distribution system that permits for vehicles and machinery with engines to be easily disposable.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
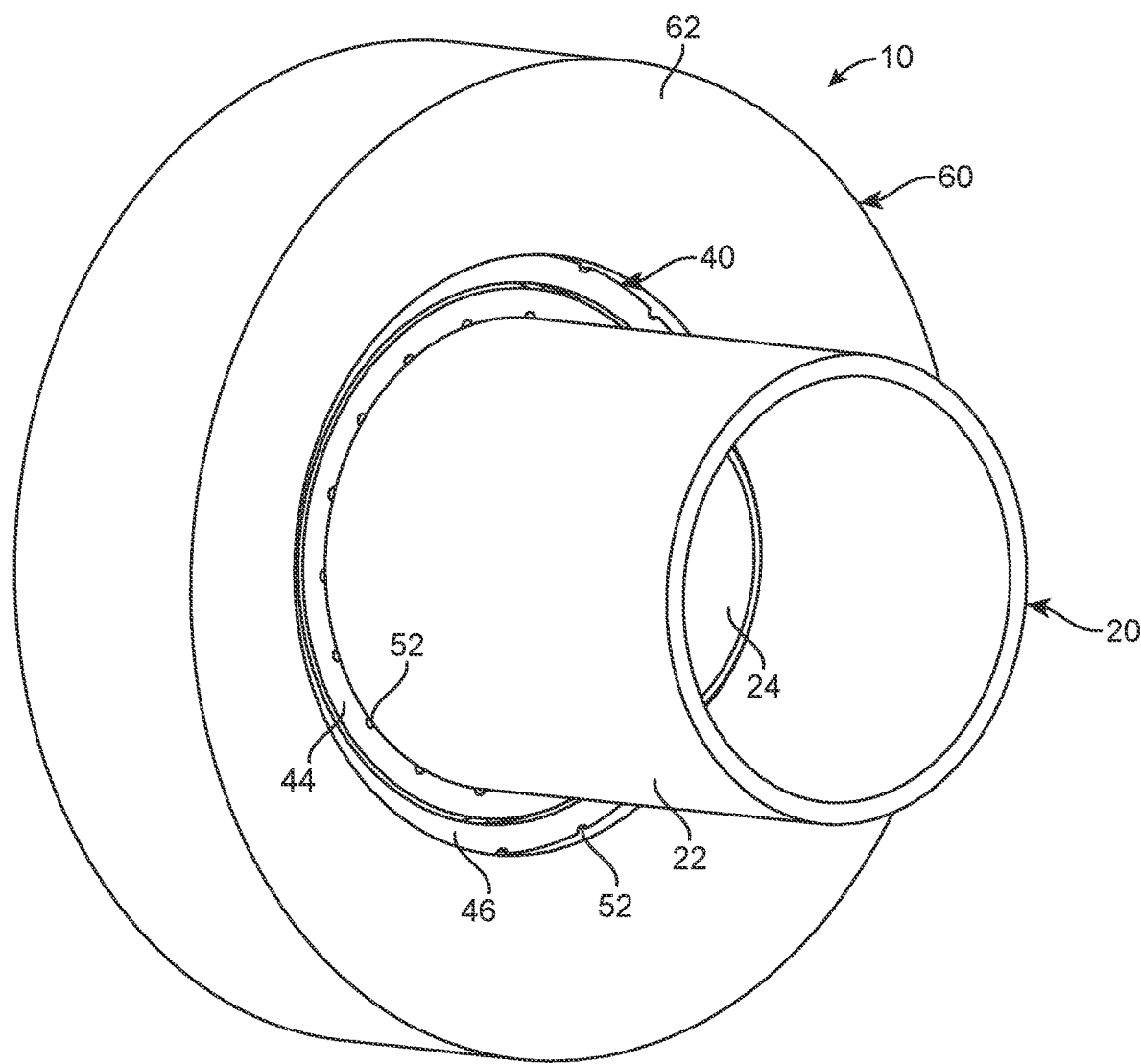
FIG. 1 represents an isometric view of the oil distribution system 10 in one embodiment.
Figure 2:
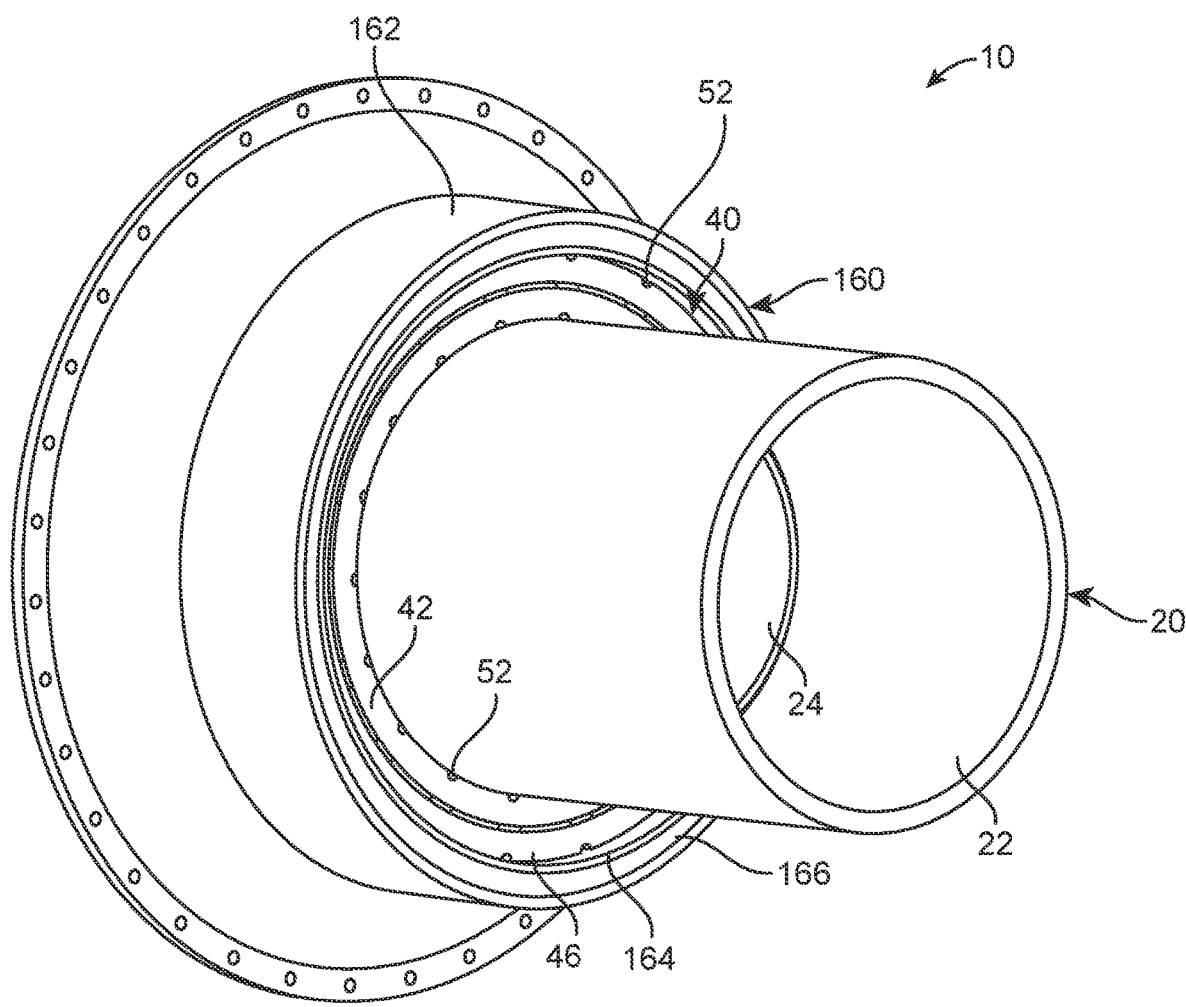
FIG. 2 shows an isometric view of the oil distribution system 10 in an alternate embodiment.
Figure 3:
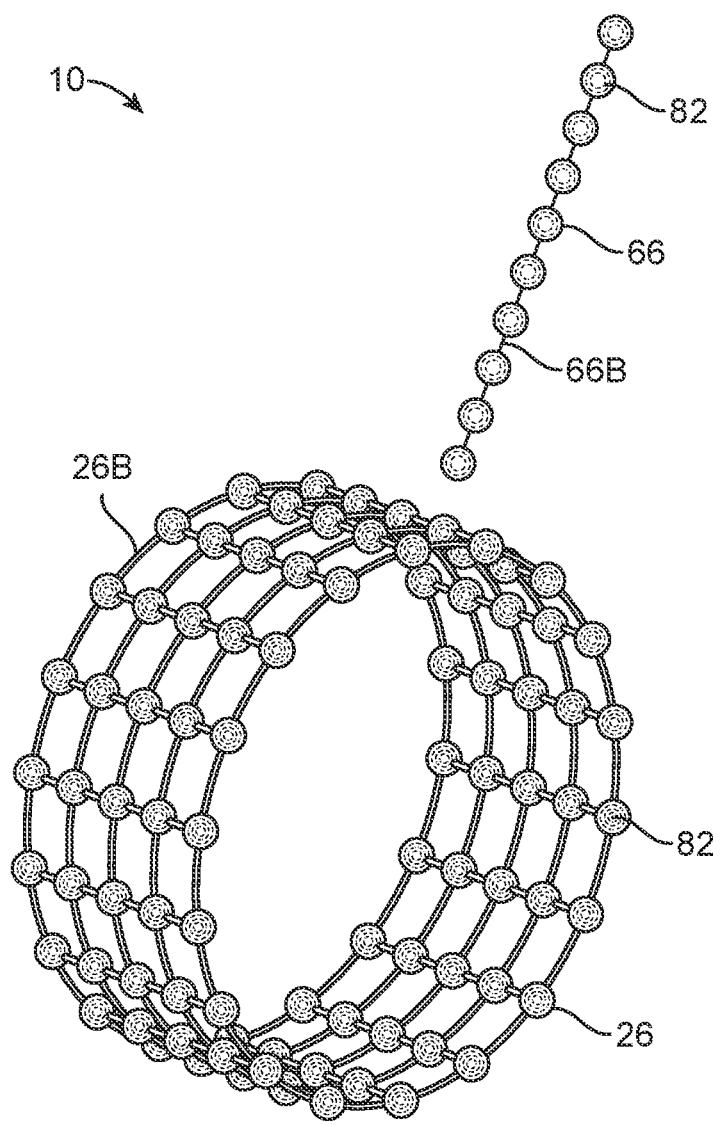
FIG. 3 illustrates an isometric view of the ringed lattice member 26 and the stringed lattice member 66, in one implementation of the present invention.
Figure 4:
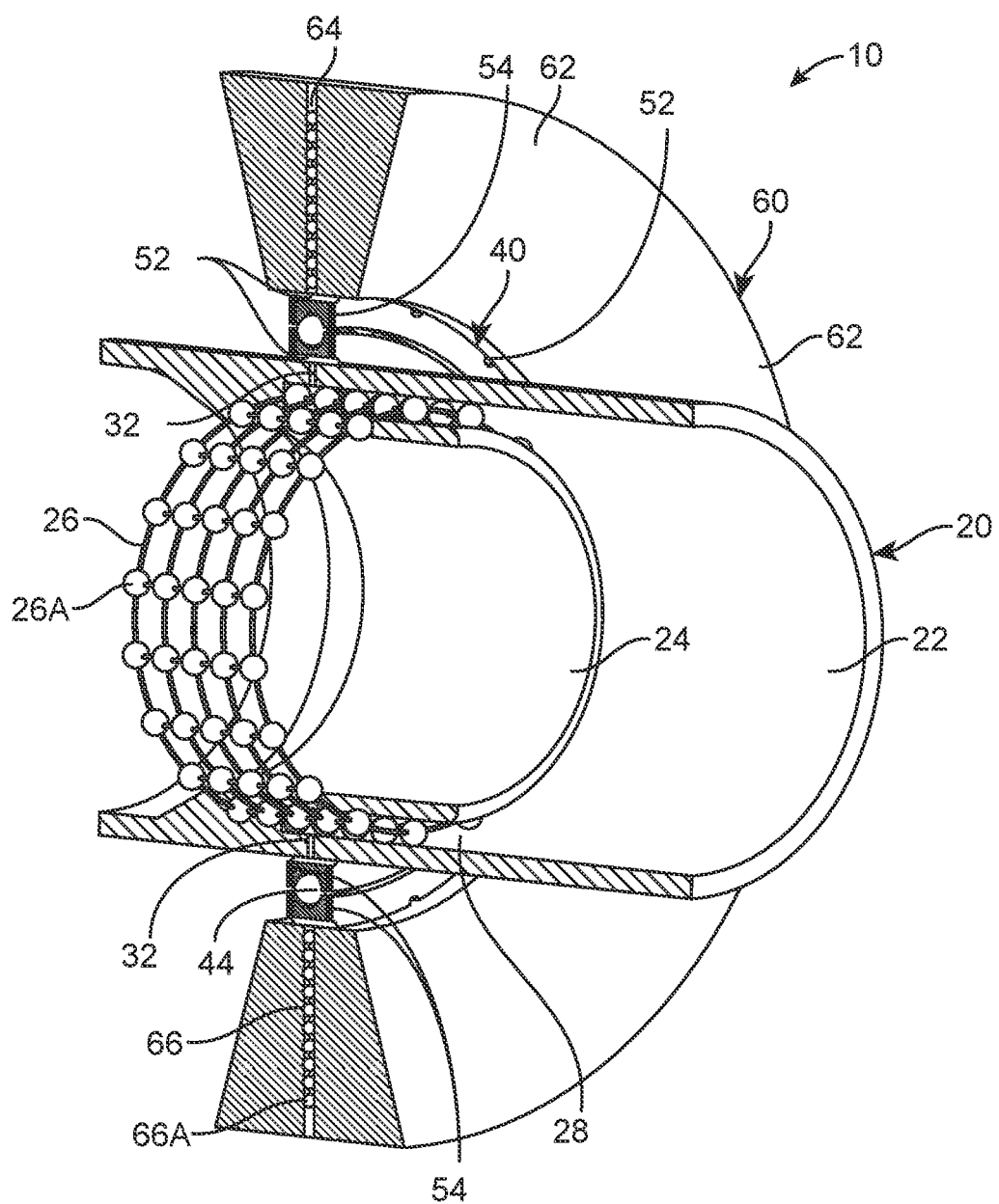
FIG. 4 is a representation of a cross-sectional view of oil distribution system 10 in one embodiment.
Figure 5:
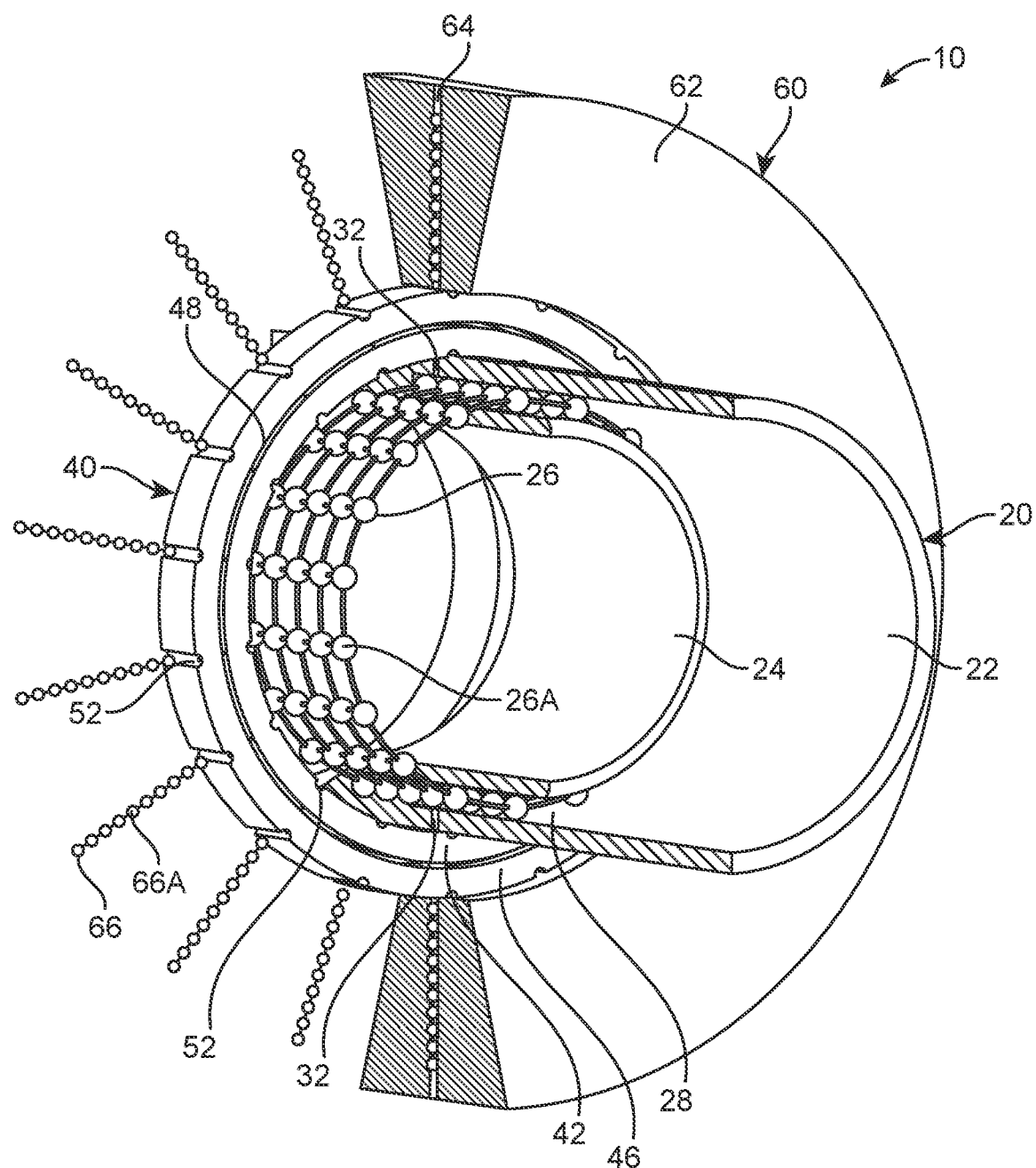
FIG. 5 represents a partial cross-sectional view of oil distribution system 10 in one embodiment.

Referring now to the drawings, where the present invention is generally referred to with numeral 10, it can be observed that it basically includes a shaft assembly 20, a bearing assembly 40 and a mounting assembly 60.

Oil distribution system 10 may help to deliver lubricants such as oils to a motor of a vehicle or other machinery to allow the motor to function properly and as needed. Oil distribution system 10 eliminates the need for the lubricants or oils to be constantly circulating through the motor. Instead, the lubricants or oils are selectively dispersed into the motor to allow proper functioning thereof. This helps to reduce the complexity, cost and weight of the motors as the need for components that permit the oils to be constantly flowing through the motor are eliminated. Additionally, the machinery or vehicles which have oil distribution system 10 incorporated within may be easily disposed of. Oil distribution system 10 may be implemented into drones used for warfare which may not so easily survive, for example.

Oil distribution system 10 includes shaft assembly 20 having a shaft 22 and can include a concentric inner shaft 24 within. It may be suitable for concentric inner shaft 24 to extend a partial length of shaft 22. A ringed lattice member 26 can be wrapped around concentric inner shaft 24 thereby holding ringed lattice member 26 in place within shaft 22. Shaft 22 and concentric inner shaft 24 may each have a cylindrical configuration in the preferred embodiment. The distance between shaft 22 and concentric inner shaft 24 defines a pocket 28 within shaft 22 that may serve as a reservoir for oil 82 resulting from the heating of ringed lattice member 26. It is to be understood that oil 82 may escape from pocket 28 through shaft slots 32 located about the perimeter of shaft 22. Shaft slots 32 may be in fluid communication with pocket 28. It is to be understood that ringed lattice member 26 may melt at a temperature of at least 130 degrees Fahrenheit.

It is to be understood that at least one of ringed lattice member 26 may be inserted within shaft 22. It is to be understood that each of ringed lattice member 26 may include ringed lattice pods 26A which are attached together with ringed lattice connectors 26B. Ringed lattice connectors 26B may extend between each of ringed lattice pods 26A. Preferably, ringed lattice connectors 26B may extend perpendicularly from each of ringed lattice pods 26A. Notably, within each of ringed lattice pods 26A may be encapsulated oil 82. Oil 82 may be injected into ringed lattice pods 26A in one embodiment. Oil 82 may suitably be a lubricant such as motor oil. In an alternate embodiment, ringed lattice pods 26A may be free from one another.

Importantly, ringed lattice member 26 may disintegrate with heat. Ringed lattice member 26 may disintegrate when a predetermined temperature is reached within shaft 22 to release oil 82 held within. Thereby allowing for oil 82 to be dispersed within the engine to lubricate bearing assembly 40 for proper functioning thereof. When ringed lattice member 26 melts, more specifically ringed lattice pods 26A, oil 82 may be momentarily stored within pocket 28. Oil 82 may escape from pocket 28 through shaft slots 32. Shaft slots 32 may extend about an entire perimeter of shaft 22. It may be suitable for shaft slots 32 to be skewed relative to shaft 22 at a predetermined angle. Shaft slots 32 may usher oil 82 within pocket 28 out of shaft 22 and towards bearing assembly 40. In a preferred embodiment, shaft slots 32 extend from pocket 28 to bearing assembly 40. Multiple shaft slots 32 can be located around shaft 22 that cooperate with various receiving locations of bearing assembly 40. It may be suitable to access pocket 28 from front or rear of shaft 22. Pocket 28 may have a depth that extends partially along the length of shaft 22.

The engine of machinery or vehicles is powered by combustion. A turbine within the engine is actuated as a result of that combustion, the turbine then drives shaft 22. Shaft 22 rotates within bearing assembly 40. It is to be understood that bearing assembly 40 extends about the entire perimeter of shaft 22. Bearing assembly 40 includes inner race 42 that extends along the inner circumference of bearing assembly 40. Bearing assembly 40 also includes an outer race 46 that extends along the outer circumference of bearing assembly 40. It is to be understood that a spacing 48 exists between inner race 42 and outer race 46. Spacing 48 is formed by the separation between inner race 42 and outer race 46. Inner race 42 is connected to shaft 22 using a press fit and both spin simultaneously at the same rate. The axial and radial forces from shaft 22 are therefore transmitted to inner race 42. Bearing elements 44 extend along the circumference of bearing assembly 40 and are rotating with inner race 42 that rotates around the shaft 22. Bearing elements 44 may be ball bearings or rollers, for example. Bearing elements 44 are also spinning about their own axis. Bearing elements 44 absorb radial and axial forces transmitted on inner race 44 thereby also absorbing radial and axial forces from shaft 22. This absorption of those two forces by bearing elements 44 keeps shaft 22 aligned in place when the engine is in operation. Inner race 42 rotates while outer race 46 is static during engine operation. In one embodiment, outer race 46 is mounted to mounting assembly 60 using press fit or any other method of mounting bearing assembly 40 to the engine casing. In another embodiment, outer race 46 can be mounted to a location on the engine casing using an intermediary member such as a bearing support member. Bearing elements 44 are within a bearing cage and both move together at the same rate. The bearing cage ensures appropriate spacing between the bearing elements 44 within bearing assembly 40.

Figure 9:
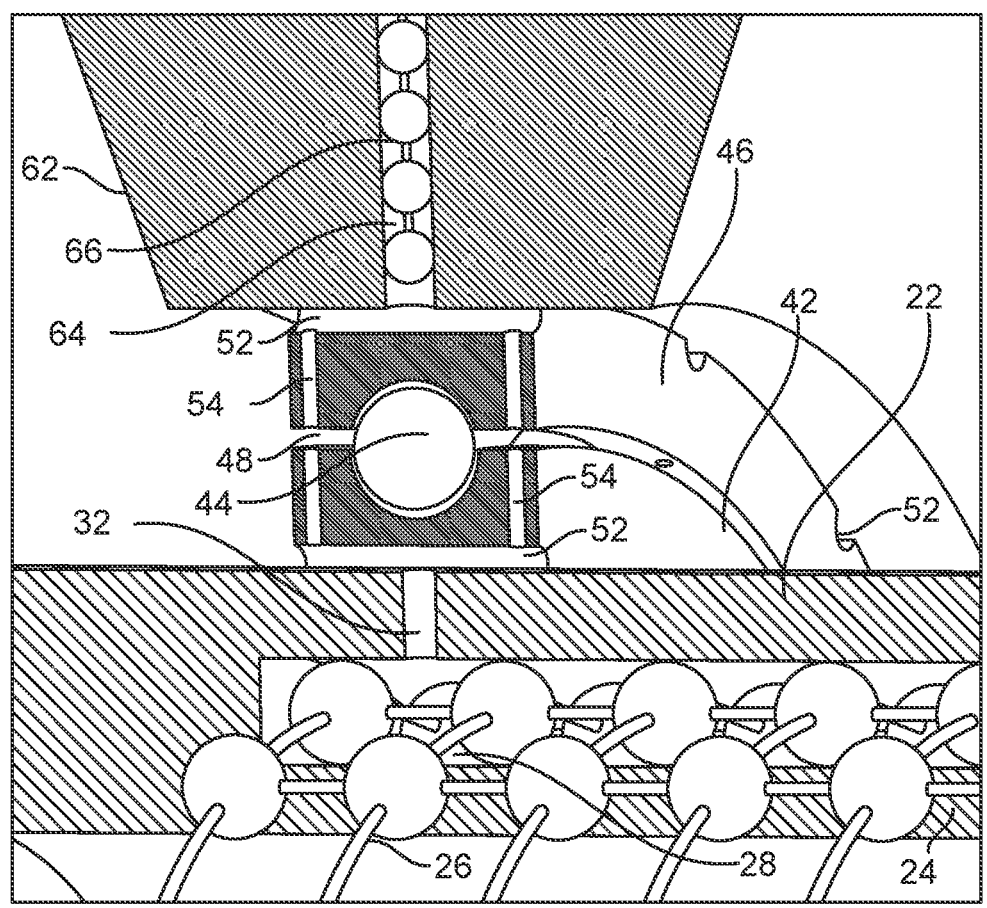
FIG. 9 is a zoomed in cross-sectional view of oil distribution system 10 showing the axial slots 52 and the radial slots 54, in one implementation of the present invention.

Each of inner race 42 and outer race 46 may include axial slots 52 and radial slots 54. Axial slots 52 of inner race 42 may extend evenly spaced apart about the inner circumference of inner race 42. Axial slots 52 of outer race 46 may extend evenly spaced apart about the outer circumference of outer race 46. Axial slots 52 may be recessed in each of inner race 42 and outer race 46. Axial slots 52 on inner race 42 may be parallel to axial slots 52 on outer race 46 when inner race 42 and outer race 46 align. Axial slots 52 may extend a thickness of each of inner race 42 and outer race 46. Extending perpendicularly from each of axial slots 52 towards spacing 48 may be radial slots 54. Radial slots 54 may extend internally within each of inner race 42 and outer race 46. Radial slots 54 may be on opposite lateral sides of each of axial slots 52 and be perpendicular to axial slots 52. It is to be understood that shaft slots 32 may align with axial slots 52 on inner race 42. Thereby allowing for oil 82 within pocket 28 to flow from shaft 22 through shaft slots 52 and into inner race 42 through axial slots 52. Oil 82 may then continue to flow from inner race 42 towards spacing 48 and eventually towards outer race 46. Additionally, bearing elements 44 are also lubricated when bearing assembly is flooded with oil 82. Axial slots 52 and radial slots 54 assist oil 82 in flowing though through bearing assembly 40 for lubrication thereof. Axial slots 52 and radial slots 54 may be best illustrated in FIG. 9. It is to be understood that axial slots 52 on both of inner race 42 and outer race 46 can be open on one or both sides to allow more of oil 82 to be distributed through the system. Alternatively, axial slots 52 on inner race 52 and outer race 54 can be closed on both sides to direct the flow of oil 82.

Secured about the perimeter of bearing assembly 40 may be mounting assembly 60. Mounting assembly may assist bearing assembly 40 in remaining intact and functioning as needed. Mounting assembly 60 may include an intermediary member such as a bearing support 62. Bearing support 62 may extend about the entire perimeter of bearing assembly 40. Shaft 22 and inner race 42 may rotate while outer race 46 and bearing support 62 remain stationary during the operation of the present invention. It is to be understood that bearing support 62 may include bearing support slots 64. Bearing support slots 64 may be evenly spaced apart and each extend a towards a center of bearing support 62. It may be suitable for bearing support slots 64 to be closed on at least one end, in one embodiment. It may also be suitable for bearing support slots 64 to be open on both ends, in an alternate embodiment. Bearing support slots 64 may be parallel to each other. It is to be understood that within bearing support slots 64 may be received a stringed lattice member 66. Each of bearing support slots 64 may receive at least one of string lattice member 66. It is to be understood that each of stringed lattice member 66 may include a stringed lattice pods 66A secured together with stringed lattice connectors 66B similarly to ringed lattice pods 26A and ringed lattice connectors 26B. It is to be understood that stringed lattice member 66 may be similar to ringed lattice member 26 and hold oil 82 within. Stringed lattice member 66 may have stringed lattice pods 66A arranged in a column configuration. Stringed lattice member 66 may melt to release oil 82 through bearing support slots 64 down into bearing assembly 40. Bearing support slots 64 align with axial slots 52 located on outer race 46. As outer race 46 and bearing support 62 are stationary, axial slots 52 on outer race 46 are constantly aligned with bearing support slots 64. Thereby allowing for oil 82 from bearing support 62 to flow into outer race 46 and towards spacing 48 for lubrication of bearing assembly 40. Bearing assembly 40 may be flooded by oil 82 from shaft 22 and from bearing support 62 for proper functioning of the engine of the machinery or vehicles. It is to be understood that stringed lattice member 66 may melt at a temperature of at least 130 degrees Fahrenheit.

Figure 6:
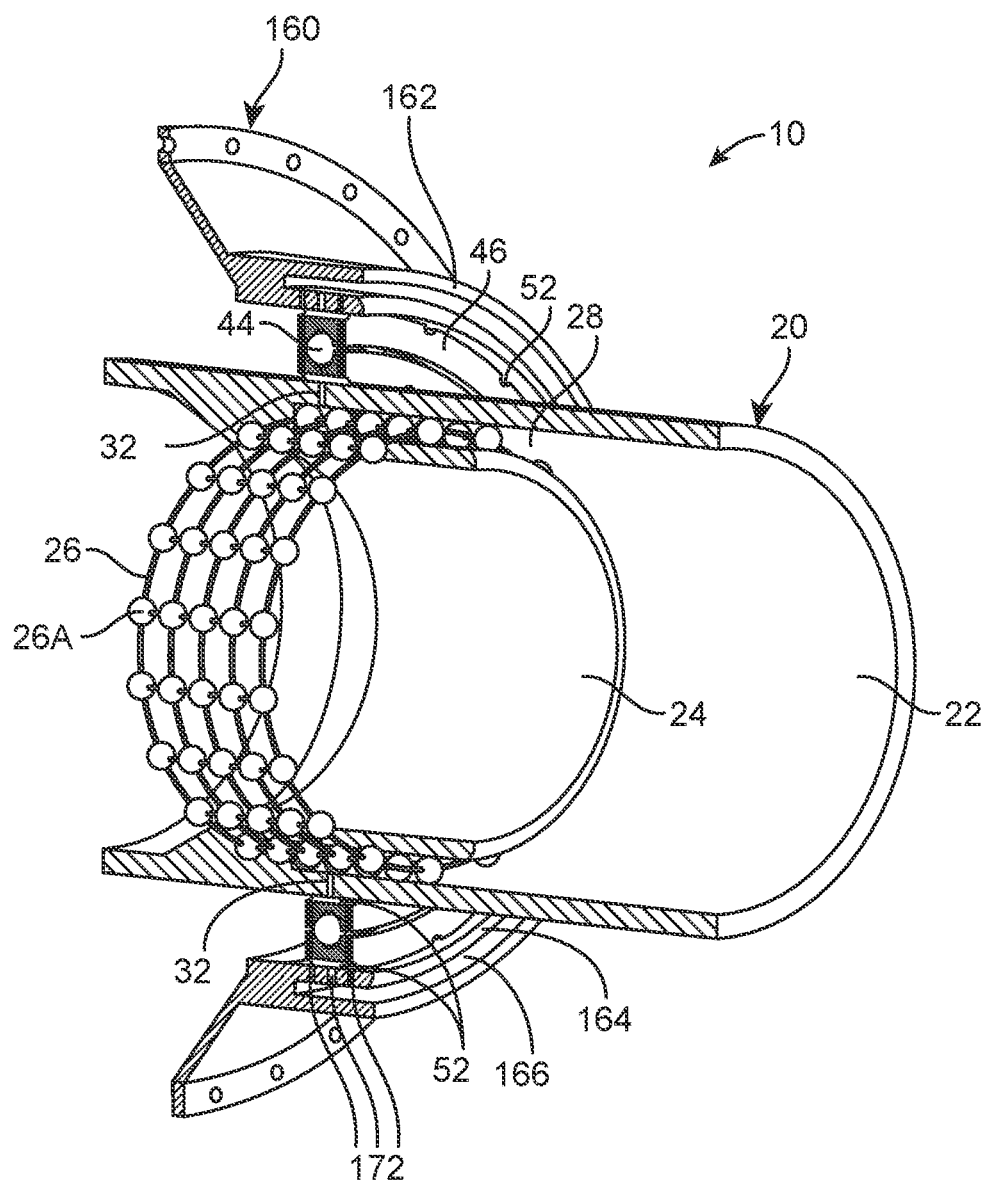
FIG. 6 show a partial cross-sectional view of oil distribution system 10 in an alternate embodiment.
Figure 7:
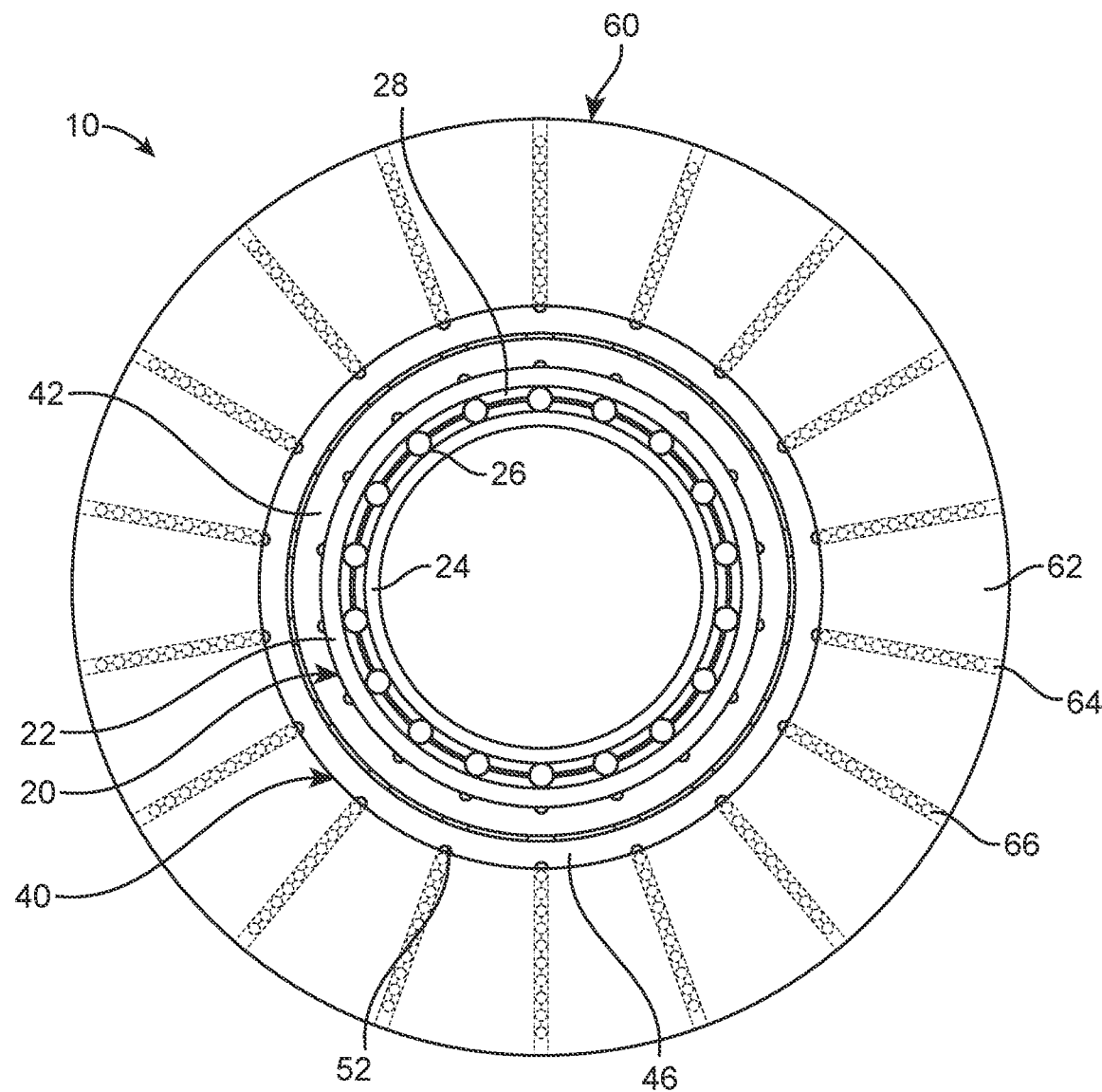
FIG. 7 illustrates a front view of oil distribution system 10 in one embodiment.
Figure 8:
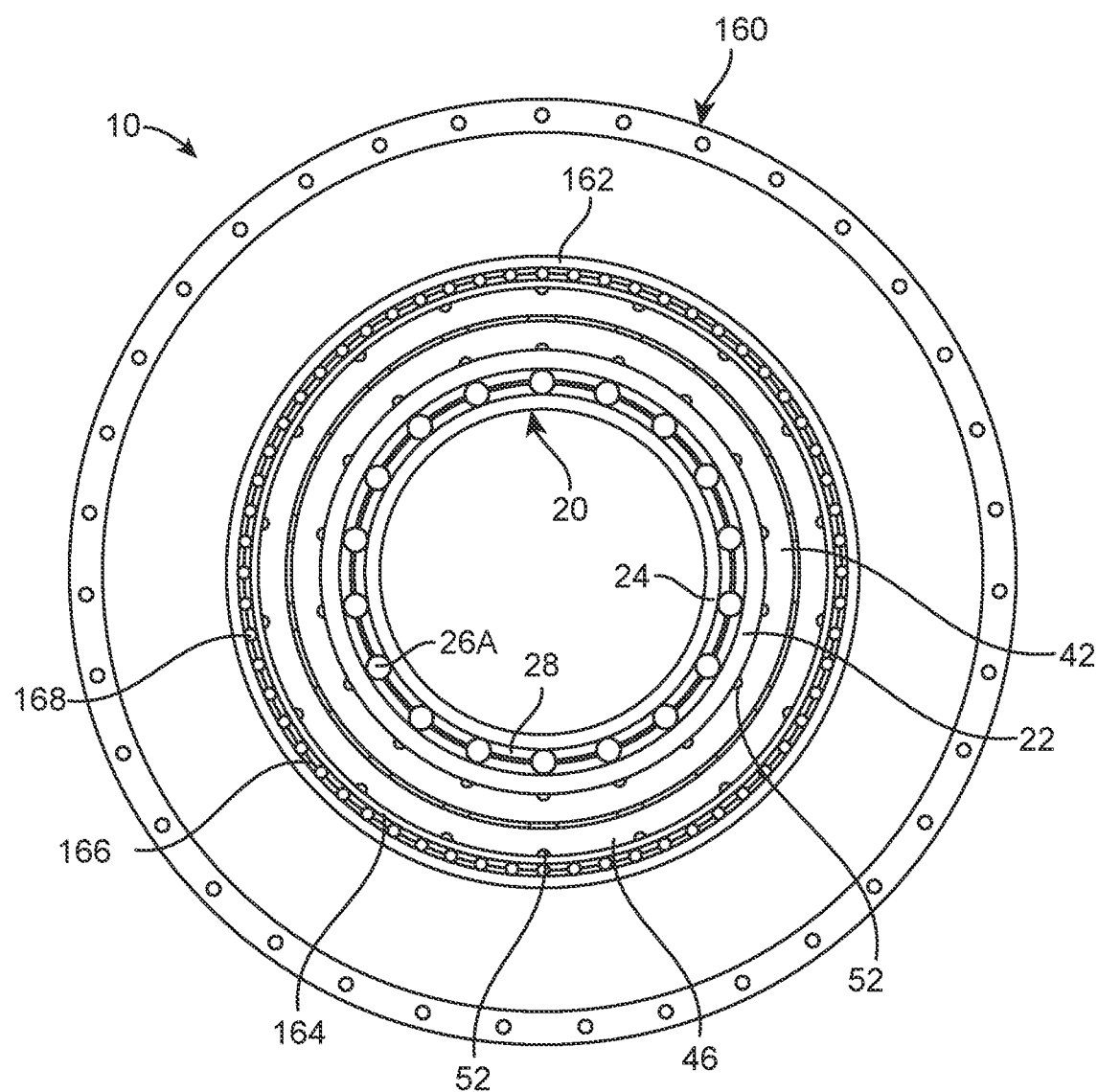
FIG. 8 is a representation of a front view of oil distribution system 10 in an alternate embodiment.

In an alternate embodiment, as seen in FIGS. 6 and 8, secured about the entire perimeter of bearing assembly 40 may be a mounting assembly 160. Mounting assembly 160 may include a bearing support 162 having a bearing support inner member 164 within. Bearing support 162 may include a bearing support pocket 166 therein. Bearing support pocket 166 may be defined as the distance between bearing support 162 and bearing support inner member 164. Bearing support pocket 166 may extend about an inner perimeter of bearing support 162. It can be seen that bearing support pocket 166 may be recessed within bearing support 162. Secured within bearing support pocket 166 may be a ringed bearing support lattice member 168. Ringed bearing support lattice member 168 may be similar to ringed lattice member 26. It may be suitable for ringed bearing support lattice member 168 to have dimensions greater than ringed lattice member 26, in one embodiment. Ringed bearing support lattice member 168 may melt at a temperature of at least 130 degrees Fahrenheit.

Importantly, bearing support inner member 164 may include bearing support slits 172, as illustrated in FIG. 6, in fluid communication with bearing support pocket 166. Bearing support slits 172 may be located along the perimeter of bearing support inner member 164. Bearing support slits 172 may be adjacent and parallel to each other, as seen in FIG. 6. Bearing support slits 172 may be skewed at a predetermined angle relative to bearing support pocket 166. Bearing support slits 172 may align with axial slots 52 on outer race 46, allowing for oil 82 dispersed from ringed bearing support lattice member 168 to flow out of bearing support pocket 166 through bearing support slits 172 into outer race 46 and towards inner race 42 and spacing 48. As outer race 46 and bearing support 162 are stationary, axial slots 52 of outer race 46 are in constant alignment with bearing support slits 172. Thereby allowing for bearing assembly 40 to be flooded with oil 82 for proper lubrication and function of the present invention.

Oil distribution system 10 is capable of selectively distributing oil 82 to the engine of vehicles or machinery for the proper lubrication thereof. Thereby allowing for the vehicle or machinery including oil distribution system 10 to not have to have oil 82 constantly flowing therethrough. This helps to reduce the cost and weight of the machinery or vehicles produced and their respective motors. Advantageously, the machinery or vehicle may be made disposable due to the reduced costs.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An oil distribution system, comprising:
   a) a shaft assembly including a shaft, said shaft including shaft slots disposed along a circumference of said shaft, at least one shaft lattice member containing oil within secured within said shaft, said at least one shaft lattice member melting when a predetermined temperature is reached within said shaft to release said oil from said at least one shaft lattice member; and
   b) a bearing assembly secured about the circumference of said shaft, said bearing assembly including an inner race, said inner race including oil distribution slots, said shaft slots aligning with said oil distribution slots of said inner race to permit the oil from the shaft to be ushered towards the inner race to flood the bearing assembly with the oil for lubrication thereof.

2. The system of claim 1, wherein each of said at least one shaft lattice includes shaft lattice pods interconnected together, said at least one shaft lattice melting at a temperature of at least 130 degrees Fahrenheit.

3. The system of claim 2, wherein said shaft lattice pods are interconnected with shaft lattice connectors that extend perpendicularly between each of the shaft lattice pods.

4. The system of claim 1, wherein said oil distribution slots are defined as axial slots and radial slots, said axial slots being along an inner circumference of said inner race.

5. The system of claim 4, wherein said radial slots of said inner race are perpendicular to said axial slots of said inner race, said radial slots extending towards a center of said inner race, said radial slots permitting said oil to flow freely within said bearing assembly.

6. The system of claim 1, wherein said shaft includes a concentric inner shaft therein.

7. The system of claim 6, wherein a pocket is defined as a distance between said shaft and said concentric inner shaft, said at least one shaft lattice secured within said pocket.

8. The system of claim 1, wherein said shaft slots are skewed at a predetermined angled relative to said shaft.

9. The system of claim 1, wherein said bearing assembly further includes an outer race secured about the entire circumference of said inner race, a spacing being defined between said inner race and said outer race, said oil seeping from said inner race towards said outer race and said spacing, said outer race including additional of said oil distribution slots.

10. The system of claim 1, wherein said system further includes a mounting assembly having a bearing support, said bearing support including bearing support slots.

11. The system of claim 10, wherein each of said bearing support slots extend a width of said bearing support along an entire circumference of said bearing support evenly spaced apart and parallel to each other.

12. The system of claim 10, wherein said bearing support slots each receive at least one bearing support lattice member therein.

13. The system, of claim 12, wherein each of said at least one bearing support lattice member includes stringed lattice pods containing said oil therein, said stringed lattice pods secured together with stringed lattice connectors that extend between each of said stringed lattice pods, said stringed lattice pods melting when a temperature of at least 130 degrees Fahrenheit is reached within said bearing support slots to release said oil held within.

14. The system of claim 12, wherein said bearing support slots being in constant alignment with said oil distribution slots of said outer race, thereby permitting the oil released from the at least one bearing support lattice to seep into the outer race through the oil distribution slots of the outer race towards the inner race.

15. An oil distribution system, comprising:
   a) a shaft assembly including a shaft having a concentric inner shaft within, a pocket defined as a distance between said shaft and said concentric inner shaft, said shaft including shaft slots in fluid communication with said pocket, said shaft slots disposed along a circumference of said shaft, at least one ringed lattice member containing oil secured within said pocket, said at least one ringed lattice member melting when a predetermined temperature is reached within said shaft to release said oil from said at least one ringed lattice member; and
   b) a bearing assembly secured about the perimeter of said shaft, said bearing assembly including an inner race and an outer race, said inner race and said outer race having a spacing therebetween, said outer race extending about a perimeter of the inner race, each of the inner race and the outer race include axial slots and radial slots, said axial slots on said inner race being about an inner circumference of said inner race, said axial slot on said outer race being about an outer circumference of said outer race, said shaft slots extending from said pocket towards said inner race, said shaft slots aligning with said axial slots of said inner race to permit the oil from the pocket to be ushered towards the inner race, said radial slots of said inner race being in fluid communication with said axial slots of said inner race to permit the oil to flow through said inner race and towards said outer race, said oil from said inner race seeping through said radial slots towards the spacing and the radial slots of said outer race to flood the bearing assembly with the oil for lubrication thereof.

16. The system of claim 15, wherein said system includes a mounting assembly including a bearing support having a bearing support inner member therein.

17. The system of claim 16, wherein a bearing support pocket is defined between said bearing support and said bearing support inner member, said bearing support pocket extending about a perimeter of said bearing support inner member.

18. The system of claim 17, wherein at least one ringed bearing support lattice member is secured within said bearing support pocket about a circumference of said bearing support inner member, said ringed bearing support lattice member being larger than said ringed lattice member.

19. The system of claim 18, wherein said bearing support inner member includes bearing support slits along a perimeter thereof, said bearing support slits being in fluid communication with said bearing support pocket.

20. The system of claim 19, wherein said bearing support slits are in constant alignment with said axial slots of the outer race, thereby allowing for the oil from the ringed bearing support lattice member, when said ringed bearing support lattice member melts, to seep into the outer race and towards the spacing to flood the bearing assembly with the oil for lubrication thereof.

* * * * *